Sept. 9, 1958
A. E. PAYNE
2,850,819
INDICATING MEANS
Filed March 9, 1953
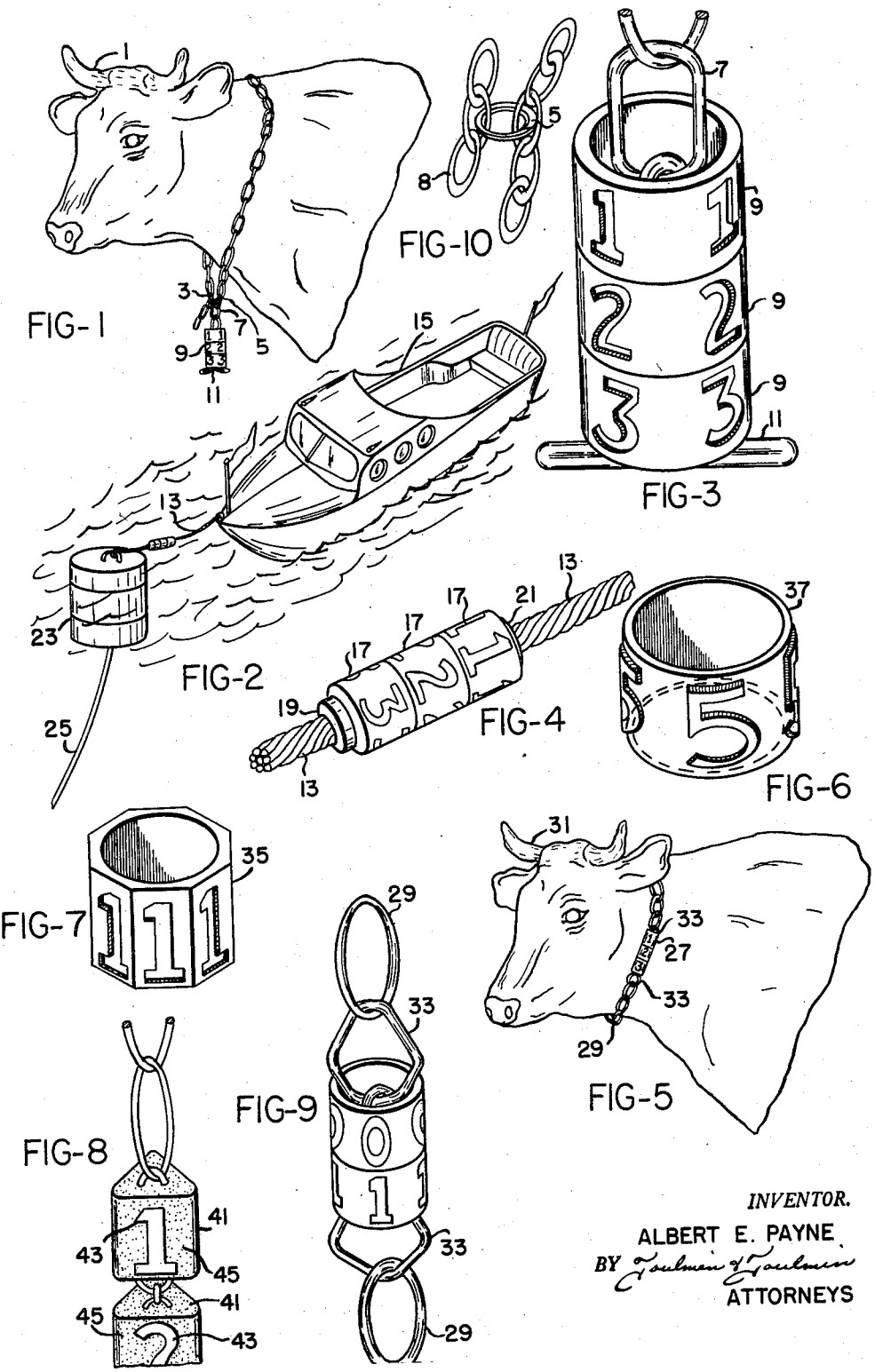
INVENTOR.
ALBERT E. PAYNE
BY Toulmin & Toulmin
ATTORNEYS

United States Patent Office 2,850,819
Patented Sept. 9, 1958

2,850,819

INDICATING MEANS

Albert E. Payne, Springfield, Ohio

Application March 9, 1953, Serial No. 341,295

1 Claim. (Cl. 40—3)

This invention relates to indicating or marking means and is particularly concerned with markers for animals, ship moorings and other things which normally will have a degree of motion with respect to an observer.

Markers, for example for cattle, which are currently on the commercial market generally consist of a simple tag secured to a chain about the neck of the animal. This tag which may be numbered on both sides is usually fixedly positioned on the chain and accordingly any slight movement of the animal tends to move the tag also and reading thereof is exceedingly difficult for an observer. Since many herds include several thousands of head of cattle it is difficult with present markers to make an accurate and rapid check of a herd or portions thereof, or to readily identify particular animals. Frequently with present markers it is necessary to actually take hold of an animal and steady the marker in order to determine the designation on the tag.

Similarly, with a boat marker which is placed on the securing lines of a craft, the boat must normally be closely approached in order to ascertain the designation thereof and movement of the lines hinders such determination. Thus with large fleets, for example, of dinghies, where the boats are very similar in appearance, adequate marking is essential for ready identification.

It is a principal object of this invention to provide a novel marker structure which is viewable and identifiable from substantially all angles.

It is a particular object of this invention to provide a novel marker structure having indicia which may be readily changed.

These and other objects of the invention are attained by providing marker elements which are in the form of short tubular members; the exterior surface of each member carries a single designator or numeral and this designator or numeral is reproduced around the perimeter of the member to an extent sufficient to insure that when in use the numeral or other designator will be viewable from substantially all angles.

A number of the described elements or members may be strung in series on a suitable strand, as of rope, cable, or wire chain, and the numerals on adjacent members may then be read in the applicable predetermined order to establish the intelligence conveyed by the marking. It is of course understood that a single element or any convenient number of elements may be employed on a single strand in order that the purpose to be subserved by the marking will be accomplished readily.

The manner in which the indicia of the elements is formed on the surfaces is not critical but may be selected in accordance with the particular use to which the elements are to be put. Thus the indicia may be impressed or cut into the surface or may be upraised therefrom; the indicia need not in fact be integral with the surface but may be removable therefrom. Indicia of various colors may be employed and each color may have its own distinctive significance. For example where weight is a factor as on markers for smaller animals the numerals 932 in a red color may represent the number 1932 while the same numerals in blue may represent the number 2932—in other words in appropriate circumstances the color may itself connote a serial number.

Where suitable the indicia may be luminescent, an effect which may be achieved by simply employing a luminescent paint; thus the paint may be employed as an outline background for a numeral or may be employed to form the numeral if so desired.

The indicia may also of course be of any weather resistant grade of enamel or paint.

The strand, that is the chain, rope or cable may be provided with suitable stoppers to effect support of the marker elements in a predetermined position. Thus where chain is employed the links of the chain may be expanded slightly to effect the required support, rope may be knotted for the same purpose and cable may be readily provided with clamping means to hold the markers positioned.

The cable and the material of the marker may be metal, plastic, wood or of any suitable nature having the physical characteristics required for the particular purpose.

The invention will be more fully understood by reference to the following detailed description and the accompanying drawings wherein:

Figure 1 is a perspective view illustrating the marker of invention applied to an animal;

Figure 2 is a perspective view illustrating the use of the marker of invention in connection with a small boat;

Figure 3 is an enlarged view of the marker of Figure 1;

Figure 4 is an enlarged view of the marker of Figure 2;

Figure 5 illustrates another mode of securing the marker element to an animal;

Figure 6 illustrates a single marker element having a numeral reproduced around the periphery thereof;

Figure 7 illustrates a marker similar to that shown in Figure 6 but of octagonal shape;

Figure 8 illustrates a solid marker with indicia and luminescent background and permanently secured to a chain;

Figure 9 illustrates another mode of securing the marker elements in position on a chain; and Figure 10 is an enlarged view of a portion of the structure of Figure 1.

Referring to the drawing there is shown in Figure 1 at 1 a breeding animal having a chain 3, portions of which are connected together at any convenient position by a form of split helical ring clamp 5, which connection is shown more clearly in the adjacent Figure 10. As illustrated in Figure 1 the chain 3, below the clamp 5, includes a portion 7 on which there are mounted marker elements or members 9 which abut on a support 11; support 11 is securely fixed to the lower link of the chain 3 in any suitable manner as by a weld and extends substantially at right angles to the chain to retain the elements 9.

The marker elements or members 9 may closely engage the chain 3 so that movement of the members on the chain is effected only with difficulty. Preferably however, as shown most clearly in Figure 3, the inner dimension of the marker 9 is such that free turning movement thereof on the chain 3 may occur. This latter feature is particularly desirable to prevent the secure snaring of the marker by bushes, etc.

It will be noted that in Figures 1 and 3 a plurality of indicia are provided about the outer perimeter of each marker and that accordingly the numeral applicable to each marker is readily visible even though the animal may turn from the direct line of view and even though the marker may turn on the chain.

The structure thus described in Figures 1, 3 and 10 is advantageous in that the links of the chain (Figure 10) may be readily passed into the ring clamp 5 which itself consists of turns of a heavy metal ribbon; these turns are in adjacent spring-like relationship and are separable upon application of pressure to permit the chain links to pass into the central enclosed portion of the clamp. The links are thus retained so as to be movable within the ring within limits and also the connection between the two chain ends is substantially a floating one. In fact the removable clamp may be considered to make a portion of the chain defining the bight endless, and as indicated in Figure 1 the bight of the chain is itself readily adjustable since it is not necessary that the chain ends themselves be secured together.

When it is desired to remove the chain the chain links may be passed out of the ring clamp 5 and the chain straightened to permit removal of the markers 9; the sequence of these marker elements may thus be easily altered—for example the elements of the structure of Figure 1 may be returned to the chain in the reverse order or the middle marker bearing the indicia "2" may become an end element; further other elements may be added or a lesser number of elements may be employed; it is to be noted in this connection that it is possible to arrange the elements of Figure 1 in 15 different combinations, including the use of the elements singly and in pairs.

An important feature of the invention as illustrated in these Figures 1, 3 and 10 is that the arrangement of the marker elements on a single strand, symmetrical with the axis of the strand, in the manner illustrated in Figure 1 of the drawings, insures that the center of gravity of the lower portion 7 of the chain will always be such that the marker elements will lie in a vertical plane and be readily visible even though the chain may shift on the animal's shoulders due to movement of the animal or contact with bushes, trees, and so forth. The employment of metal, such as brass, for the marker assists this action, as a metal marker while compact in dimensions has excellent weight characteristics for the purpose as well as good wearing qualities.

In Figures 2 and 4 a line 13 for the securing of a boat 15 carries markers 17 which are similar to the markers or marker element of Figure 1. However in this case the line 13 is provided with stoppers 19, 21 which securely engage the line and hold the markers from longitudinal movement thereon. These stoppers may be simply close fitting apertured plugs which frictionally engage the line; alternatively short pieces of rope or cloth may where desirable be employed to position the marker element series.

For the sake of clarity boat 15 is shown as having line 13 connecting the floating barrel 23 which is anchored as by anchor line 25.

In Figure 5 the marker elements 27 are indicated as supported directly on the chain 29 of the animal 31. The elements are positioned between expanded links 33 of the chain as indicated in the enlarged view in Figure 9.

Referring to Figures 6 and 7 it will be noted that each of the elements 35 and 37 have the indicia thereof visible from substantially any angle since the numeral is reproduced about the perimeter of the element a number of times. The outer perimeter may have any suitable configuration although a circular contour is preferred due to the ease of manufacture of such marker.

Referring now to Figure 8 it will be noted that at 41 a solid plastic element is shown having a substantially triangular cross section. Each of the faces of the element 41 is provided with indicia as at 43 and the plastic material itself may bear luminescent background 45. In this instance the chain is completely and permanently imbedded into the plastic material although the plastic elements may be cut from the chain and replaced with other elements as set out, for example, in Figure 3. A passage through the plastic for the chain may of course be formed by machine operations rather than molding the same, if desired.

While indicia which appear on the elements may be of any suitable type it is generally preferable to employ numerals, letters and color variations in order to set forth with facility the desired intelligence. Thus, for example, referring to Figure 3 the designation indicated by the marker system may be 321 if read from bottom to top and may be 123 if read from top to bottom in accordance with a prearranged plan. As indicated hereinbefore the numerals may all be colored in order to connote a particular series, or the background may be colored, and substantially any type of code desirable to fit a particular purpose may be employed.

Further the outer perimeter may be circular or polygonal and these arrangements also may be utilized to indicate a serial or code number.

It will be understood that this invention is susceptible to modification in order to adopt it to different usages and conditions and accordingly, it is desired to comprehend such modifications within this invention as may fall within the scope of the appended claim.

I claim:

A marker for attachment to livestock for readily identifying the same, said marker consisting of a chain formed of metal links engageable about the neck of the livestock and including a single strand chain portion depending from and supporting by said neck chain portion, a plurality of rings having a marking indicia thereon loosely supported on said depending chain strand to provide for free turning movement thereof, said rings having a greater inside diameter than the width of said chain links whereby said rings slide readily over the links of said chain, and means disposed on the lower end of said depending chain portion and consisting of a flattened link welded to the lower chain link and extending substantially at right angles to the longitudinal axis of the depending chain portion to retain the loosely mounted rings carrying the marking indicia on said chain portion, said marking rings being cylinder-shaped and having a plurality of duplicate indicia thereon which is readily visible from different angles and relative positions of the marking ring with respect to the supporting chain portion carried by the livestock.

References Cited in the file of this patent

UNITED STATES PATENTS

| | | |
|---|---|---|
| 1,371,925 | Morgenthaler | Mar. 15, 1921 |
| 1,477,235 | Ballou | Dec. 11, 1923 |
| 1,556,106 | Hamilton | Oct. 6, 1925 |
| 1,567,021 | Detlefsen | Dec. 22, 1925 |
| 1,575,775 | Lesser | Mar. 9, 1926 |
| 1,740,992 | McCretton | Dec. 24, 1929 |
| 2,074,280 | Smith | Mar. 16, 1937 |
| 2,282,852 | Chann | May 12, 1942 |
| 2,327,433 | Johnson | Aug. 24, 1943 |
| 2,374,323 | Bihr | Apr. 24, 1945 |
| 2,440,023 | Schacht | Apr. 20, 1948 |
| 2,461,777 | Schacht | Feb. 15, 1949 |
| 2,503,114 | Kennard | Apr. 4, 1950 |

OTHER REFERENCES

Publication, "Electrical Review" for October 28, 1941, vol. CCLIX, issue 3857, page 78.